Figure 4:
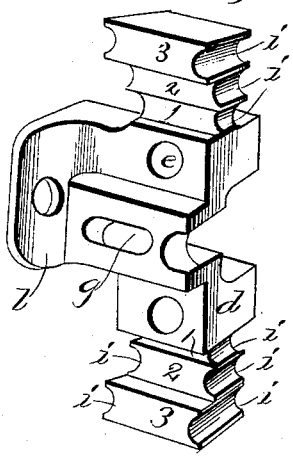

(No Model.) 2 Sheets—Sheet 1.
G. W. DOOLITTLE.
PLOW.
No. 435,172. Patented Aug. 26, 1890.
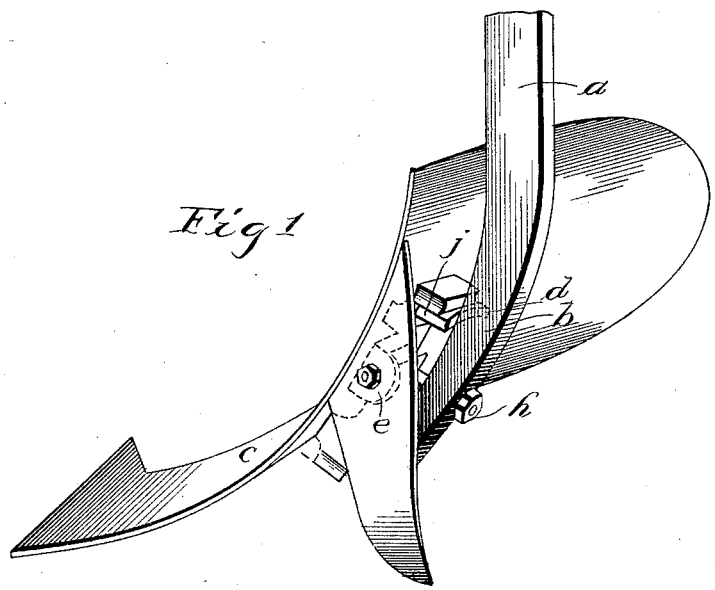
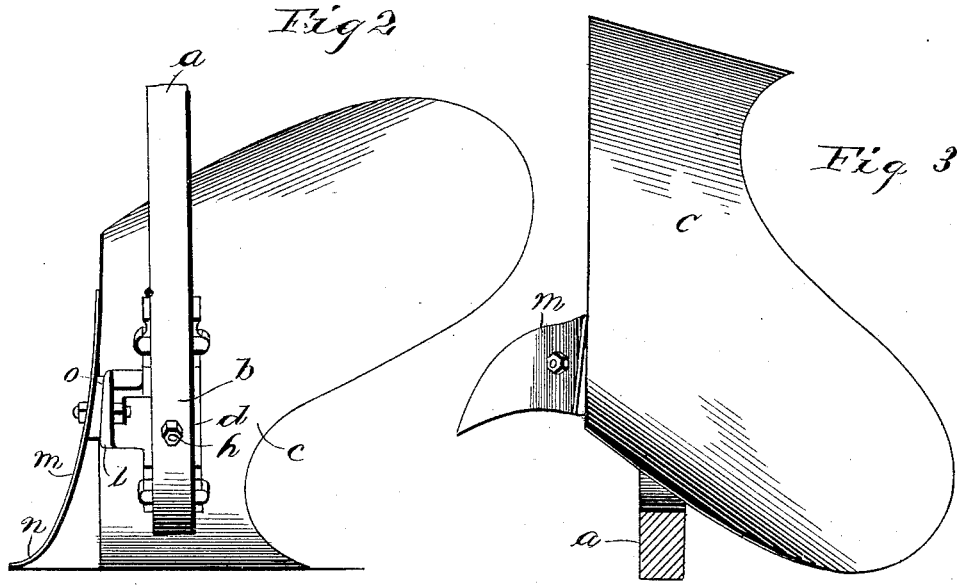
Witnesses
C. C. Burdine
H. E. Peck
Inventor
G. W. Doolittle
per O. E. Duff
Atty.
THE NORRIS PETERS CO., PHOTO-LITHO., WASHINGTON, D. C.

(No Model.) 2 Sheets—Sheet 2.

G. W. DOOLITTLE.
PLOW.

No. 435,172. Patented Aug. 26, 1890.

Witnesses
C. C. Burdin
H. E. Peck

Inventor
G. W. Doolittle
per O. E. Duff
Atty

UNITED STATES PATENT OFFICE.

GEORGE W. DOOLITTLE, OF KANSAS CITY, MISSOURI.

PLOW.

SPECIFICATION forming part of Letters Patent No. 435,172, dated August 26, 1890.

Application filed February 28, 1890. Serial No. 342,044. (No model.)

*To all whom it may concern:*

Be it known that I, GEORGE W. DOOLITTLE, of Kansas City, in the county of Jackson and State of Missouri, have invented certain new and useful Improvements in Plows; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

This invention relates to certain improvements in plows.

The object of the invention is to provide an improved cultivating or side-turning plow wherein the old landside-bar is dispensed with and a blade or cutter substituted therefor which will cut into the ground on the landside of the plow and throw the soil into the furrow, and thereby increase the amount of work done with the same expenditure of power heretofore employed in using the old plows; and a further object is to provide improved means whereby the side-turning plows can be used for cultivating and be under complete and easy control of the operator, and can be quickly and readily moved laterally to the right or left when at work, as it is a matter of great importance in cultivating to have a plow easily handled to avoid and be guided around crooked hills and rows or obstructions; and a further object is to provide improved means in a side-turning plow to counteract or overcome the constant tendency of the plow toward the landside, caused by the earth pressing laterally on the mold-board, and thereby hold the plow in a straight line without the necessity of constant watching and exertion on the part of the operator to hold the plow straight; and a further object is to provide improved means for adjustably securing and holding said landside cutter or blade to the mold-board and standard; and a further object is to provide improved, cheap, simple, and durable means for securing the mold-board and share to the standard, so that the plow can be readily adjusted to run in deeper or shallower, as desired; and a still further object is to provide an exceedingly simple durable inexpensive cultivator-plow composed of a minimum number of strong parts, which will cultivate crops in a superior manner, will work deeper and closer to the row, and thereby turn and mellow the soil, and will not merely scrape the surface of the ground in furrows a distance apart. These objects are accomplished by and my invention consists in certain novel features of construction and in combinations of parts, more fully described hereinafter, and particularly pointed out in the claims.

Figure 5:
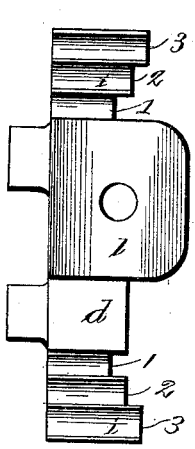
Figure 6:
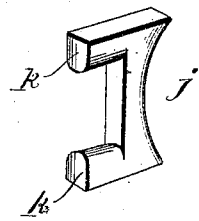
Figure 10:
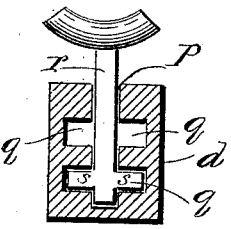
Figure 7:
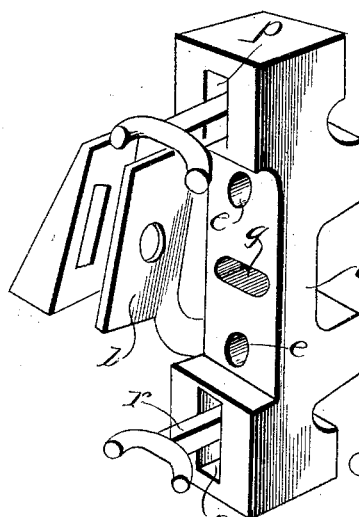
Figure 8:
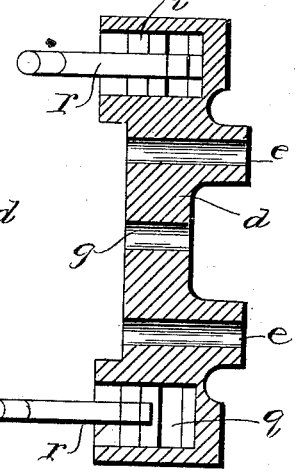
Figure 9:
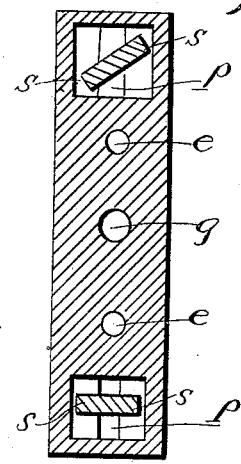

Referring to the accompanying drawings, Figure 1 is a perspective of a cultivating plow-share and mold-board provided with the present invention and attached to a cultivator-standard. Fig. 2 is a rear view of the same. Fig. 3 is a top plan of a portion of the plow, showing the relative position of the counterbalancing blade to the rest of the plow. Fig. 4 is a detail perspective of the block and attachments whereby the mold-board is secured to the standard, and to which the lateral blade is secured. Fig. 5 is a detail side elevation of the block of Fig. 4. Fig. 6 is a detail perspective of one of the saddles of and used in connection with the block shown in the two preceding figures. Fig. 7 is a detail perspective of a differently-constructed block. Figs. 8, 9, and 10 are different sections through the same.

In the drawings, the reference-letter $a$ indicates a plow or cultivator beam constructed, as usual, to the standard $b$, and carrying on its lower end the mold-board and share $c$, shaped to turn the earth to one side, and preferably having a wide share and narrow mold-board section, so as to lighten the draft and carry no more ground on the mold-board than is needed to cover weeds, &c., and also to allow the mellow ground to flow around the narrow mold-board and almost fill the furrow with clean loose ground. The mold-board is adjustably secured to the standard by means of a block $d$, such as shown in Figs. 4 and 5. The block shown in Fig. 4 is preferably formed or cast integral of oblong shape to lie longitudinally along the lower end of the standard. The block is provided with several transverse apertures $e$, surrounded by bosses on the upper or outer side of the block, which bosses rest against the rear side of the mold-board, and the mold-board is firmly bolted to said block by bolts $f$, passed through the mold-board and said apertures $e$. At or about the center the block is provided with an elongated transverse opening $g$, through which the main center bolt $h$ extends and secures the block to the standard by means of the nut or washer on its outer end at the rear side of the standard. This bolt is provided with a head on its inner end and extends loosely through said aperture $g$, so that the said block can be rocked up or down and held firmly by tightening the nut on bolt $h$.

The under sides of the ends of the blocks are provided with a corresponding series of steps increasing in height 1 2 3, &c., and the edges of the block at the ends of each step are vertically or transversely grooved, as shown at $i$, to receive the inner edges of the legs of the saddles $j\ j$, each saddle being concaved at its lower or under face to snugly fit the upper front edge of the standard, and the upper edge of the saddle is of such length and shape as to rest and extend the length of each step. At the ends the saddle is provided with a pair of upwardly-extending legs $k$, formed on their inner edges to fit and slide in the grooves or ways $i$ at the opposite ends of a step. The block is provided with two saddles located at its opposite ends. When it is desired to raise or lower the point of the plow to cut deeper, the upper saddle should be slipped from a low step and placed on a higher step—say step 2 or 3—and the lower saddle should be correspondingly placed on a lower step, say step 1 or 2. The block and mold-board will thereby be rocked, so that the point of the plow will have more of a downward tendency than before. This operation is reversed when it is desired to have the plow cut shallower. The landside edge of this block $d$ is provided with a downwardly-extending flange or arm $l$, provided with one or more bolt-holes. To this flange the upper end of a flat landside or counterbalancing-blade $m$ is rigidly bolted. This blade tapers downwardly, or is triangular in shape, and is sharpened at its front edge, and extends downwardly, with its lower end curved outwardly, so as to end at about right angles from the main portion, as shown at $n$, and to end approximately in the same plane with the lower edge of the plow-blade. When the plow is at work, this lateral blade cuts a suitable distance (usually four or five inches) into the landside beyond the cut of the plow-blade. This blade has its front cutting-edge set in, pointing away from the landside, and consequently its rear edge set out toward the landside by means of a wedge-shaped washer $o$, interposed between said blade and the block $d$ or flange thereof, to which it is bolted, the securing-bolt passing through the washer, and the washer is so constructed, as by an elongated bolt-hole, that it can be moved to adjust the angle or inclination of the cutting-blade away from the landside. By this means the contant tendency of the plow when at work to shift toward the landside (because of the pressure on the mold-board) is overcome by the pressure on said blade. The counterbalancing influence of the landside-blade can be increased or diminished by changing its inclination.

In Figs. 5 and 6 a somewhat different construction of adjustable securing-block $d$ is shown. In this construction the block is provided with the flange for the landside-blade and with the apertures to receive the mold-board bolts and bosses to fit the same and the central main bolt-hole, as before described; but this block, instead of having such adjusting means as shown in Fig. 4 is provided with two transverse preferably rectangular apertures $p\ p$ at its opposite ends, and these apertures are each provided with a series of lateral internal steps or oppositely-located internal lateral recesses $q$. Two saddles or bolts $r$ are employed, having forked outer ends, to fit the standard, and having their shanks provided with opposite lateral lugs $s\ s$ to fit each pair of opposite recesses, so that the forks will be independently adjusted and held nearer to or farther from the block, for the purpose hereinafter set forth. As before stated, the openings $p$ are oblong, so as to allow the entrance and passage therein of the saddle-shanks and oppositely-extending lugs, and as the recesses $q$ are in the wide sides of the apertures the saddles are turned to throw the lugs into or out of the pair of recesses desired.

It should be observed that the adjustable block and fastening attachments herein set forth are exceedingly strong and durable in construction and very cheap and easy to manufacture, as the parts can be cast, and there are no holes to tap or bolts to thread, thereby reducing the cost of manufacture to a minimum and increasing the strength and durability; also, the parts can be adjusted with greater ease and rapidity, and there are no screw-threads to rust and clog by dust, dirt, &c.

The landside-blade having its end curved outwardly is a great improvement, as it cuts into the ground on the landside of the plow and loosens and softens the earth and causes it to fall into the furrow behind the plow, thereby increasing the quantity of work done with the same expenditure of power as employed heretofore in operating plows. The ground is also cut and mellowed to a greater and more uniform depth than heretofore, and there are no ridges of hard uncultivated ground between the furrows, as the blade cuts out and cultivates all the ground between the furrows. This blade by reason of its shape also cuts the hard ground a distance from the landside of the plow and extends into the ground in such a manner that the plow can be easily and readily turned or guided laterally to the right or left hand, and yet by reason of the angle at which said blade is set the plow is held straight without constant watching and exertion on the part of the operator. This counterbalancing landside-blade cuts the ground on the landside beneath the surface and loosens the same from beneath and causes it to fall into the furrow behind the plow, so as to be covered by the next furrow-slice.

Instead of the straight bolt for securing the block to the standard, a U-shaped stirrup might be used.

The landside counterbalancing-blade can be secured to the inner or landside edge of the mold-board or to any other stationary part of the cultivator on the landside thereof.

What I claim is—

1. A plow or cultivator provided with an upright downwardly-tapering counterbalancing-blade rigidly secured on its landside, and having its lower end curved outwardly beyond the landside cutting-line of the plow and ending approximately in the same plane as the lower edge of the plow, as and for the purpose set forth.

2. The combination of the plow-blade, a block securing said blade to the standard, and the counterbalancing cutting-blade at its upper end rigidly secured to the landside of said block and extending downwardly therefrom, with its lower end curved outwardly beyond the landside cutting-line of the plow, for the purpose set forth.

3. A side-turning cultivator or plow provided with a counterbalancing cutting-blade extending down on the landside thereof and set so that the blade is transversely tilted and extends rearwardly and outwardly from its front cutting-edge at an angle to the line of draft, for the purpose set forth.

4. The combination, with a side-turning-plow blade, of an integral cutting-blade secured at the landside of the plow-blade and extending downwardly with its lower end curved outwardly and extending laterally a distance from the landside of the plow, so as to cut beneath the surface of the earth beyond the landside cutting-line of the plow, substantially as described.

5. The combination, with the side-turning plow or cultivator blade, of the counterbalancing outwardly-extending cutting-blade secured on the landside thereof, with its cutting-edge extending from the landside at an angle to the line of draft, and means to secure the blade, and a wedge-shaped washer to vary the angle of inclination, substantially as described.

6. The combination, with a standard and plow or cultivator blade, of a block by which said blade is secured to the standard, an arm or flange extending from the landside of said block, and a counterbalancing and cutting blade extending from the landside of the plow and bolted to said arm or flange, substantially as described.

7. The combination, with a plow or cultivator blade and a standard, of an adjustable block rigidly secured to the rear side of said blade and secured in vertically-rocking adjustment to the standard and provided with a series of steps at its ends, and saddles or stirrups interposed between said ends and the standard, whereby the point of the plow can be raised or lowered by correspondingly changing said saddle or stirrups from step to step, substantially as described.

8. The combination, with a standard and a plow or cultivator blade, of an adjustable block rigidly secured to said blade and loosely secured to the standard, a series of increasing steps at the ends of said blocks, and saddles having rear edges formed to bear against the standard and at their opposite ends formed to rest on corresponding sets of said steps and capable of being transferred to the other sets of steps, for the purpose set forth.

In testimony that I claim the foregoing as my own I affix my signature in presence of two witnesses.

GEORGE W. DOOLITTLE.

Witnesses:
 THOS. P. WEIR,
 S. L. RAINEY.